3,119,659
PROCESS FOR PRODUCING MOLECULAR SIEVE BODIES

Le Roy L. Taggart, Eden, and George L. Ribaud, Williamsville, N.Y., assignors to Union Carbide Corporation, a corporation of New York
No Drawing. Filed Sept. 26, 1960, Ser. No. 58,199
17 Claims. (Cl. 23—112)

This invention relates to a process for producing synthetic crystalline zeolites of the molecular sieve type in massive bodies or shapes. The zeolites hereinafter referred to are those crystalline metal aluminosilicates having a composition generally expressed by the formula:

$$M_{\frac{2}{n}}O : Al_2O_3 : xSiO_2 : yH_2O$$

wherein M represents at least one cation and $n$ represents its valence.

The crystalline zeolites contemplated in this invention consist basically of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $O/(Al+Si)=2$. The electrovalence of each tetrahedron containing aluminum is balanced by the inclusion in the crystal of a cation, for example an alkali or alkaline earth metal ion or other ions such as hydrogen or ammonium. One cation may be exchanged for another by various ion-exchange techniques. The spaces between the tetrahedra are occupied by water molecules prior to dehydration or activation of the crystal. Removal of these water molecules produces the characteristic pore system.

The crystalline zeolites produced by this invention include the rigid three-dimensional crystalline metal aluminosilicate structures capable of being dehydrated or activated to form molecular sieves, such as, for example, those described in greater detail in several patents and copending applications, i.e.: zeolite A, U.S. Patent 2,882,243, issued April 14, 1959, to R. M. Milton; zeolite X, U.S. Patent 2,882,244, issued April 14, 1959, to R. M. Milton; zeolite Y applications Serial No. 728,057, filed April 14, 1958, and now abandoned, and Serial No. 862,062, filed December 28, 1959, and now abandoned, both in the name of D. W. Breck; zeolite L, application Serial No. 711,565, filed January 28, 1958, and now abandoned, in the name of D. W. Breck and N. A. Acara; zeolite D, application Serial No. 680,383, filed August 26, 1957, in the name of D. W. Breck and N. A. Acara; zeolite T, U.S. Patent 2,950,952, issued August 30, 1960, also in the name of D. W. Breck and N. A. Acara; and zeolite R, U.S. Patent 3,030,181, issued April 17, 1962, in the name of R. M. Milton. The process of this invention may also be used to prepare counter-parts of naturally occurring hydrated rigid three-dimensional crystalline metal aluminosilicate structures dehydratable to molecular sieves, such as faujasite, chabazite, gmelinite, analcite, mordenite and erionite.

Generally, a particular crystalline zeolite will have values for $x$ and $y$ in the above formula that fall in a definite range. The value $x$ for a particular zeolite will vary somewhat, since the aluminum atoms and the silicon atoms occupy essentially equivalent positions in the crystal lattice.

The various types of crystalline molecular sieve zeolites may among other ways be differentiated on the basis of adsorption pore size or the operative pore diameter defined by the crystal structure. They are also distinguishable by virtue of the particular cation or cations such as sodium, potassium, calcium, ammonium, etc., which have been integrated into the crystal.

Among the ways of identifying crystalline zeolites of the molecular sieve type and distinguishing them from other crystalline substances, the X-ray powder diffraction pattern method has been found extremely useful. This method, particularly when associated with the results of the chemical analysis and adsorption measurements of the crystalline product, is a reliable means of identification. For instance, if one were to rely on chemical analysis alone, it would be difficult to accurately distinguish a true crystalline zeolite from a chemically similar but structurally different material such as sodalite or hydroxysodalite. Hydroxy-sodalite is a felspathoid material having the formula:

$$Na_2O \cdot Al_2O_3 \cdot 2SiO_2 \cdot xNaOH$$

in which, unlike the crystalline zeolites of the molecular sieve type referred to herein, NaOH fills the cavities of the structure. In other sodalite-type materials the occluded substance may be, for example, sodium halide or various sulfates and nitrates. Consequently, sodalite-type materials do not possess the rigid stable structure characteristic of, nor do they exhibit the adsorption properties of, crystalline molecular sieve-type zeolites.

The crystalline zeolitic molecular sieves are, when suitably dehydrated or activated, generally characterized by a high adsorption capacity; more especially their unique structure permits selective adsorption of fluids depending to a large extent on the size of the interstitial voids or pores of the activated crystalline zeolite. Thus, various molecular species may be readily adsorbed, slowly adsorbed or completely excluded, depending on their size, shape, polarizability and polarity. This adsorption behavior is widely utilized in such processes as gas purification and separation. Thus, for example, when zeolite A is synthesized from reactant mixtures containing substantial amounts of sodium cations, the sodium form is obtained, which when activated is particularly useful for the adsorption of molecules having critical dimensions smaller than about 4 Angstrom units while refusing larger-sized molecules. U.S. Patent 2,882,243 also describes the modification of the selective adsorption properties of sodium zeolite A that can be obtained through cation exchange. For instance, when at least about 40 percent of the sodium cations are exchanged for divalent calcium cations the characteristic adsorption pore size is enlarged to about 5 Angstrom units, yielding a molecular sieve which has been found to be extremely useful in petroleum processing directed toward octane improvement of motor fuels.

These crystalline zeolites of the molecular sieve type have up to now been synthesized only in the form of fine powders, generally of a particle size less than about 10 microns, from standard commercial reactants including sodium silicate, silicic acid, colloidal silica sols, silica gel, alumina and sodium aluminate.

As stated hereinabove, molecular sieves have up to now been synthesized in the form of a finely-divided crystalline powder, with crystals usually less than about 10 microns in size. However, the design and construction of separation and adsorption equipment to accommodate crystals of this size or the use of existing equipment for the same purpose is not always practical, since the use of these crystals causes high pressure drops through fixed beds for fluid separations. Additional difficulties are encountered in attempting to fluidize the crystals of this size.

Therefore, for many commercial uses of molecular sieves it is more desirable to have a larger molecular sieve body or agglomerate rather than the small crystals in order to achieve the highest possible volumetric adsorption capacity as well as to facilitate handling of the adsorbent.

At the same time, it is desirable that this agglomerate have not only such characteristics as relatively high attrition resistance and crush strength, but also that it retain substantially all the adsorption capacity, adsorption selectivity, and thermal stability characteristics exhibited by the finely-divided crystalline material.

Methods for preparing agglomerates such as spheres, beads, etc., from molecular sieve powder are known. Such methods involve the use of a suitable binder material such as a clay, an inorganic compound, or an organic compound. These methods, several of which have been adapted to large-scale production with satisfactory results, are however, relatively complex and require careful control to insure consistent properties in the agglomerated product. Furthermore, the binder occupies a portion of the agglomerate volume but performs no adsorptive function and hence the volumetric adsorption capacity of the agglomerate is limited at least to the extent that the binder is present.

It is, therefore, an object of the present invention to provide a novel method for producing crystalline molecular sieve bodies in a wide variety of shapes and sizes.

It is a further object to provide such a process utilizing a suitable kaolin-type starting material.

Another object is to provide an improved process for producing compact crystalline molecular sieve bodies having relatively high volumetric adsorption characteristics.

In its broadest aspect the present invention provides a method for producing a crystalline metal aluminosilicate zeolite in a preformed body, which method comprises providing an unreacted preformed body containing essentially a kaolin-type clay and alkali metal hydroxide, said hydroxide being present in an amount equivalent to at least about 0.1 mole of alkali metal oxide per mole of the $SiO_2$ present in said body, and reacting said body in an aqueous reactant mixture until crystals of said zeolite are produced in said body. The aggregate of the preformed body and the aqueous reactant mixture has an $H_2O/Na_2O$ molar ratio of at least 20. The original shape and dimensions of the preformed body are substantially retained.

A novel feature of the shaped molecular sieve zeolite bodies produced by the process of the invention is their high percentage of active adsorbent compared to that of agglomerates formed by clay-bonding of zeolite powder.

A suitable starting material for supplying part of the desired oxides according to the process of this invention constitutes a kaolin-type clay or a mixture of kaolin-type clays.

Kaolin-type clays or clay minerals have the general composition approximately $[Al_2O_3 \cdot 2SiO_2 \cdot 2\text{–}4H_2O]$ which makes such clays preferred for the synthesis of preformed zeolite A bodies; however, by adjusting the composition of the reactant mixture to be converted to zeolite with predetermined additional amount of a source of reactive silica such as colloidal silica sol, other species of three-dimensional crystalline zeolites in massive shapes having higher $SiO_2/Al_2O_3$ ratios may readily be prepared. Kaolin-type materials having $SiO_2/Al_2O_3$ ratios in the range of about 1.8 to nearly 2.3 are known, and these also may be used in the process of this invention.

The kaolin-type or two-layer clays are described as sheet-like crystalline silicates. Their basic structural unit is an aluminosilicate sheet consisting of a layer of silicon cations in tetrahedral co-ordination with oxygen anions, bonded to a layer of aluminum cations in octahedral co-ordination with oxygen or hydroxyl anions. These sheets are stacked one on top of another to form the small plate-like crystals of the mineral. Representative of the clay minerals which contain this two-layer sheet and which may be used in the process of this invention are: kaolinite, levesite, nacrite, dickite, endellite and halloysite. They differ only in the way that the basic structural sheets are stacked. Pure kaolinite, $[Al_2O_3 \cdot 2SiO_2 \cdot 2H_2O]$, has the composition by weight $Al_2O_3 = 39.56\%$
$SiO_2 = 46.54\%$
$H_2O$ (combined) $= 13.90\%$

TABLE A

*Analyses of Typical Kaolin-type Materials*

| Oxide | Georgia Kaolinite A | | Georgia Kaolinite B | | North Carolina Kaolinite C | | Utah Halloysite | |
|---|---|---|---|---|---|---|---|---|
| | Percent by wt. | Moles | Percent by wt. | Moles | Percent by wt. | Moles | Percent by wt. | Moles |
| $Na_2O$ | 0.2 | | 0.40 | | } 0.82 | | <0.1 | |
| $K_2O$ | <0.1 | | 0.43 | | | | | |
| $Al_2O_3$ | 40.2 | 1.0 | 37.20 | 1.00 | 37.2 | 1.0 | 37.3 | 1.00 |
| $SiO_2$ | 45.0 | 1.9 | 44.82 | 2.04 | 48.2 | 2.20 | 41.6 | 1.89 |
| Ign. loss (as $H_2O$) | 9.4 | 1.33 | 14.68 | 2.23 | 13.1 | 1.99 | 20.0 | 3.04 |
| $TiO_2$ | 2.5 | | 1.26 | | | | | |
| Other | 1.4 | | 1.31 | | 0.78 | | | |
| | 98.8 | | 100.1 | | 100.1 | | 98.9 | |

The data of Table A include analyses of some typical kaolin-type clays found to be suitable in the process of the invention. As may be seen, the molar ratio of $SiO_2/Al_2O_3$ in these examples varies, i.e., 1.9, 2.04 and 2.20, but is within the over-all range between about 1.8 and 2.3.

Kaolin-type clays are also known by such names as "ball clay," "fire clay," "papermaking clay," "filler clay," "coating clay," and "china clay." Commercial kaolins may be contaminated with quartz, fine-grained mica, hydrous micas and sometimes feldspar, but their presence at impurity levels will generally not be detrimental to either the process or the preformed zeolite product. Commercially available kaolin-type materials are, for example, "Avery" clay sold by Harris Clay Company, "Edgar" kaolins, sold by Minerals and Chemicals Corporation, and "Hydrite" kaolins, sold by Georgia Kaolin Company.

Kaolin-type clay minerals when thermally treated appear to undergo several transitions, although the exact natures of the products of such transitions are not clearly known nor are the mechanisms of the behavior completely understood. There is in fact considerable speculation and disagreement in the literature concerning this matter. When kaolin-containing clays are heated in air for a sufficient length of time, the first of these transitions is observed to begin at about 550° C–600° C., where the crystalline silicate sheets are apparently destroyed, or at least altered or disordered, yielding a product which is essentially amorphous to X-rays. This transition product or metastable phase is sometimes referred to as "meta-kaolin," "metakaolinite," "dehydrated kaolin," or "dehydroxylated kaolinite." Roy et al. [Jour. Amer. Ceram. Soc. 38, 205 (1955)] have defined "metakaolinite" as "a metastable high-free-energy phase in the range 600° C. to 900° C. At about 950° C. another transition apparently occurs.

As stated hereinabove, the exact nature of the transformed kaolin associated with a thermal treatment at 550°–850° C. is not clearly known, because it is essentially amorphous to X-rays. By "amorphous to X-rays"

it is meant that the X-ray spectrometer trace exhibits substantially no sharp diffraction bands and is similar to that obtained for a glass. For reasons given hereinbelow this transformed kaolin as is used in the process of this invention will be referred to as "reactive kaolin."

Although kaolin-type materials have a chemical composition which makes them adaptable as reactants for the synthesis of crystalline zeolite bodies of the molecular sieve type, it has been discovered that such kaolin-type materials must have undergone a particular thermal treatment before being useful, i.e., reactive, in the practice of this invention.

In a preferred form of the invention the raw kaolin-containing material is given thermal treatment described hereinbelow prior to the shaping step, when this material is in powder form. For this purpose, a satisfactory range of ultimate particle sizes is, in terms of (average) equivalent spherical diameter, less than about 75 microns (200 mesh) size. Raw kaolin-type materials may be put into such condition by ordinary mechanical means or may be obtained commercially in suitable particle sizes. Representative particle sizes for commercially available raw kaolin-type materials useful in this process are in the range of about 50 to 0.1 microns. Also commercially available are kaolin-type materials already suitably fired to the reactive kaolin condition; again, such materials usually have ultimate particle sizes in the range of about 50 to 0.1 microns.

One may also defer the required thermal treatment until after the raw kaolin-type material and alkali metal hydroxide with or without other ingredients added thereto, is shaped or formed into compacts or bodies as described below. Thus, the required transformation of raw kaolin-type materials to reactive kaolin substance may be effected in situ. The kaolin-type substance useful in the process of the invention may be made up of a single type or species of kaolin-type mineral or a mixture of members of the kaolin group.

When the kaolin-type material is to be converted to "reactive kaolin" by a thermal treatment, the temperatures and times at which the conversion is best carried out are interdependent. For instance, a minor degree of conversion will take place at temperatures at, and slightly below 550° C.; that is, on a percentage basis, there will be some reactive kaolin in any batch so treated. Above 600° and preferably between 600° C. and 850° C. total conversion to the reactive kaolin state might be expected if the firing conditions are maintained for a sufficient length of time. A higher firing temperature lessens the time required, and conversely at less than about 600° C., a considerably greater period will be required to bring about a suitable degree of conversion. We have found that at a firing temperature of 600° C. at least about 45 to 60 minutes are usually required to produce substantial quantities of crystalline zeolite; somewhat shorter periods of firing at 600° C., while causing some alteration of the original kaolin structure do not make the kaolin sufficiently reactive to produce more than minor amounts of crystalline zeolites in the shaped body. At the same time undesirably large amounts of hydroxy-sodalite are obtained in the shaped body. The presence of hydroxy-sodalite, or other sodalite-type materials, none of which is a rigid three-dimensional crystalline zeolite of the molecular sieve type, to the extent of more than about 10 20 wt.-percent (but preferably not more than about 10 wt.-percent) in the shaped zeolite body is undesirable because the volumetric adsorption capacity thereof is somewhat reduced. In the region of about 700° C. to 800° C., firing times of as low as 10–15 minutes have been used with satisfactory results when relatively thin beds of charge material, on the order of ¼ to ¾ inches in depth, are used. However, at least about one hour is usually preferred to insure thorough treatment of the charge.

After kaolin-type materials have been brought into a reactive condition for the synthesis of preformed crystalline zeolite bodies, this condition of reactivity is retained during storage. Thus, for example, in the process of this invention one may also use as a starting material a commercially available kaolin-containing material, as previously mentioned, that has already been suitably fired to achieve the transformation to reactive kaolin, or, alternatively, a mixture comprising portions of raw kaolin and reactive kaolin. This mixture is then heated in a gas-fired or electrically heated furnace, kiln, oven, etc., or by other suitable means to convert the raw kaolin-type material to the reactive kaolin state.

When the step of firing to form reactive kaolin is conducted after the body has been shaped from a mixture of alkali metal hydroxide and raw kaolin or from a mixture of alkali metal hydroxide, raw kaolin and reactive kaolin, the temperatures for conversion to reactive kaolin are again in the range of about 600–850° C., with a firing time of about one hour preferred. When raw kaolin is incorporated into the shaped body along with alkali metal hydroxide, control of the moisture content of the resulting mass is important with respect to the degree of conversion of the body to crystalline zeolite ultimately obtained.

Ambient air is conveniently used as the atmosphere in which the kaolin-type materials are fired; however, other firing atmospheres may be used if desired.

As stated hereinabove, a novel feature of the invention is the incorporation of a known quantity of alkali metal hydroxide, into mixtures containing finely divided kaolin-type material, preferably in a reactive condition, prior to the shaping of useful bodies or articles, wherein the incorporated alkali metal hydroxide is the major source of alkali metal oxide in such bodies or articles, from such mixtures, such that upon subsequent treatment of these bodies in aqueous reactant mixtures of specified molar composition crystalline zeolites of the molecular sieve type are produced in situ, with the original shape and dimensions of the preformed body substantially retained.

In compacting or forming these bodies from the alkali metal hydroxide-reactive kaolin mixtures, any of several methods may satisfactorily provide whatever shape is desired, as for example, beads, spheres, pellets, granules, cylinders, tubes, partitions, toroids, cubes and the like. These may be bodies of relatively small size as well as bodies of more massive section, depending upon the desired end use. Representative of methods which may be used to accomplish the shaping or forming steps are molding, extruding, tumbling, drum-rolling, casting, slip-casting, disk-forming, belt-forming, prilling, tableting, and briquetting.

After the forming or shaping step, the bodies are dried so that the moisture content is usually less than about 30 wt.-percent. The bodies, if formed from reactive kaolin substance, are now in suitable condition for conversion to crystalline zeolite in situ; or, if formed wholly or in part from raw kaolin-containing material, must first be given the required thermal treatment at 600°–850° C. At this point, these bodies have usually developed adequate "green strength," particularly in the case of the relatively simple shapes such as pellets or spheres. In fact, the development of "green strength" therein is materially aided by the inclusion of the alkali metal hydroxide. Thereupon, the shaped reactive body is to be made a part of the over-all reaction mixture for the conversion process. Before such reaction mixture can be prepared, one must previously have determined by chemical analysis the composition, usually given in terms of the oxides, of the kaolin-type starting material. Usually the raw kaolin is analyzed, and another analysis made of the reactive kaolin to control the over-all composition of the reactant mixture, since such composition is critical to the formation of the desired zeolite species. The amount of previously incorporated alkali metal hydroxide (conveniently expressed as the oxide) in the shaped body is, of course, known beforehand, and this determines how much additional alkali metal hydroxide must be provided in the ambient liquor. Similarly, the moisture content of the green bodies must be known and its value taken into account in arriving at the desired over-all reactant composition. The ambient liquor, which may also contain known quantities of any other components of known chemical composition as may be required for the particular over-all composition of the reactant mixture, is then contacted with a quantity of the shaped or preformed reactive kaolin-containing bodies ("preforms") in such proportions that upon mixing, the resulting aqueous reaction mixture will contain in the aggregate quantitative amounts (in terms of moles of oxides) of aluminum, silicon, alkali metal, and water, along with any substances that may be needed to facilitate the conversion process, that upon subsequent reaction thereof under specific conditions the preform will be converted in situ to the desired crystalline zeolite. Also, as described hereinbelow, certain materials may be combined with the kaolin-type substance prior to shaping the body, and some or all of these materials will contribute to the over-all composition of the initial reactant mixture. Thus, in the preparation of such preformed crystalline zeolites, the aqueous reactant mixture will have an initial over-all composition, defined in terms of oxide-mole ratios, as follows:

$M_2O/SiO_2 = a$
$SiO_2/Al_2O_3 = b$
$H_2O/M_2O = c$ where the particular values of $a$, $b$ and $c$ are the essential determinants for the type of crystalline zeolitic material to be produced, where M is at least one cation such as alkali metal, ammonium, etc.

In preparing the ambient liquor prior to the introduction of the shaped reactive kaolin bodies containing a quantity of alkali metal oxide in the form of the hydroxide, any of several suitable materials may be used to supply the additional ions needed to achieve the over-all initial reactant mixture composition. For instance, representative reactants are silica gel, silicic acid, colloidal silical sol, or alkali metal silicate as a source of added silica. Additional alumina ions may be furnished by activated alumina, gamma alumina, alumina trihydrate, or alkali metal aluminate. An amount of alkali metal oxide is usually included in the aqueous liquor in addition to that contributed by the hydroxide previously included in the preformed bodies; when producing shaped zeolite bodies in which the cation is predominantly or exclusively sodium, such additional amount may be introduced into the liquor in the form of sodium hydroxide. Similarly, when producing shaped zeolite bodies in which the cation is predominantly or exclusively potassium or lithium, such additional amount of corresponding potassium or lithium ion may be introduced into the reactant mixture in the form of the hydroxide.

In producing massive preformed shapes of crystalline sodium zeolite A by the process of the present invention a useful range of reactant mixture ratios is as follows:

$Na_2O/SiO_2 = 0.5-1.5$
$SiO_2/Al_2O_3 = 1.6-2.5$
$H_2O/Na_2O = 20-100$

For producing preformed shapes of high-purity zeolite A using preincorporated sodium hydroxide, a particularly useful range is as follows:

$Na_2O/SiO_2 = 0.7-1.2$
$SiO_2/Al_2O_3 = $ about 2
$H_2O/Na_2O = 20-50$

Preformed shapes containing crystalline sodium zeolite X using preincorporated sodium hydroxide have been produced by employing a reactant mixture composition as follows:

$Na_2O/SiO_2 = $ about 1.5
$SiO_2/Al_2O_3 = $ about 5
$H_2O/Na_2O = 30-50$

Preformed shapes containing crystalline sodium zeolite Y using preincorporated sodium hydroxide have been produced by employing a reactant mixture composition as follows:

$Na_2O/SiO_2 = $ about 0.5
$SiO_2/Al_2O_3 = $ about 7
$H_2O/Na_2O = $ about 40

Shaped bodies of zeolites having mixed sodium and potassium cations in the as-crystallized product may be similarly obtained using reactive kaolin and included alkali metal hydroxide or hydroxides. Representative species are zeolites D, L and T identified hereinabove.

By this invention higher purity product and a more efficient process result when prior to shaping the body, alkali metal hydroxide is combined with the kaolin-type material in an amount equivalent to at least about 0.1 mole of alkali metal oxide ($R_2O$) per mole of $SiO_2$ in the mixture. As the $R_2O/SiO_2$ ratio in the preform is decreased below about 0.1, product purity decreases considerably, the preform loses strength and the advantage of rapid processing time diminishes. It has been found that the time required to convert the shaped body to one containing essentially crystalline molecular sieve-type zeolite is dependent on the rate at which, for example in the case of the sodium form of the zeolite, sodium ions, or possibly as $Na_2O$, can diffuse into the shaped body from the ambient reaction mixture. However, by intimately contacting the kaolin-containing material with a portion of the total $Na_2O$ content ultimately required in the over-all composition of the reactant mixture, at an earlier point in the process of the invention, i.e., before the shaping step, the sodium ion thus already included in the body is more readily available for reaction during the subsequent digestion and crystallization steps. Thus, in the case of sodium zeolites, $Na_2O$ is introduced into the kaolin-containing material in the form of sodium hydroxide, NaOH. Incorporation of caustic in the reactive kaolin substance also helps to bind the shaped body together and tends to impart strength to the body.

In general, the shaping or preforming of bodies from a kaolin-type material including an amount of alkali metal oxide incorporated in the form of the hydroxide yields molecular sieve bodies possessing improved volumetric adsorption characteristics. It may also be useful in the process of the present invention, prior to the preforming step, to intermix with the kaolin-type substance minor amounts of other materials such as lubricants or surface-active agents to aid in subsequent processing steps such as extrusion or other forming of shapes. Usually to the kaolin-alkali metal hydroxide mix is added a quantity of water to aid in blending the ingredients uniformly as well as to bring the mix to the desired consistency according to the particular shaping or forming procedure to be employed. For example, a mixture which is to be formed into articles by slip-casting would usually be in the form of a slurry or "slip," while a mixture which is to be formed into pellets, as by extrusion, or into spherical particles, as by drum-tumbling, usually has a somewhat lower water content such that the mix is a moist, cohesive powder. Part or all of such water may, of course, be added as part of the medium by which the alkali metal hydroxide is introduced into the raw kaolin or into the reactive kaolin, for example, aqueous caustic solution.

In producing silica-rich zeolites such as X and Y, all or part of the silica required to achieve the over-all reactant composition, over and above the amount of silica supplied by the reactive kaolin, may be incorporated with the kaolin-alkali metal hydroxide mixture prior to the shaping step. Thus a source of silica such as silicic acid, silica gel, colloidal silica sol or alkali metal silicate may be blended with the kaolin and alkali metal hydroxide prior to shaping. In like manner, if one desires to supply alumina over and above that supplied by the reactive kaolin, a source of alumina such as alumina trihydrate, activated alumina or alkali metal aluminate may be blended with the kaolin and alkali metal hydroxide prior to shaping. In cases where one uses alkali metal silicate or aluminate, allowance must be made for the additional alkali metal ion supplied by such silicate or aluminate in arriving at the final or over-all reactant composition which is determined by the composition of the shaped body and the composition of the aqueous liquor with which the body is contacted.

The quantity of sodium hydroxide, in terms of $Na_2O$, which may be contacted with the kaolin-type clay to be shaped may, in the case of zeolite A, be from about 0.1 up to about 0.7 $Na_2O/SiO_2$. For example, zeolite A beads, made by a tumbling process from reactive kaolin, water and 0.6 $Na_2O/SiO_2$ adsorbed 20.2 wt.-percent oxygen at 100 mm. Hg pressure and $-183°$ C., indicative of a high-purity product. When the incorporated $$Na_2O/SiO_2$$

was increased to 0.75 in making another batch, the resultant beads contained about 65% zeolite A and some hydroxy-sodalite. Formation of the latter, sometimes along with other aluminosilicates, tends to occur at incorporated $Na_2O/SiO_2$ ratios somewhat above stoichiometric. A quantity of alkali metal hydroxide equivalent to the molar $R_2O$ which is equal to or less than the stoichiometric value for the zeolite crystal is preferred for highest quality products and to minimize any thermal effects which might arise from the mixing of the kaolin-containing materials and hydroxide. For instance, in the production of sodium zeolite A, an amount of NaOH equivalent to an amount of $Na_2O$ within the range of about 0.1 to 0.5 mole of $Na_2O$ per mole of silica is preferred, the particular value in this range depending in part upon the over-all composition of the particular reactant mixture.

The source of alkali metal oxide which may be in the form of liquid, solid or slurry of alkali metal hydroxide, is intimately contacted with the kaolin-type clay and any other ingredients by blending, kneading, mulling, or other suitable mixing method.

We have also found that incorporation of a quantity of a powdered crystalline zeolite of the molecular sieve type with the reactive kaolin and caustic before the shaping step results in desirable processing characteristics and a quite satisfactory product from the standpoint of product purity and physical properties. The crystalline zeolite used here is the same species as that which one requires in the shaped body after the crystallization step. The zeolite incorporated in the mixture to be shaped may itself have been prepared from reactive kaolin or from reactants such as alkali metal silicate, alkali metal aluminate, and alkali metal hydroxide. Alternatively, a naturally occurring zeolite of the same species may be incorporated in the mixture to be shaped. The process wherein a body is formed from a mixture containing essentially crystalline zeolite, reactive kaolin and incorporated alkali metal hydroxide and then converted to essentially pure crystalline zeolite is a preferred form of practicing this invention.

Exemplary of the advantage of the alkali metal hydroxide inclusion method when used in the preparation of preformed crystalline zeolite bodies are the results of a series of tests using reactive kaolin-NaOH mixtures to obtain massive zeolite A bodies. A group of reactive kaolin pellets, into which varying amounts of NaOH had been included to give various ratios of $Na_2O/SiO_2$, were converted to crystalline zeolite A material. The preformed bodies, in this instance $1/16$- and $1/8$-inch diameter cylindrical pellets, were contacted with suitable aqueous reactant mixtures to produce sodium zeolite A; thereafter the bodies were washed and analyzed by X-ray and adsorption methods. The percentage of crystalline zeolite A material in the reaction product is a measure of the effect of incorporated caustic on the particular reactant mixture. In this instance an amount of included NaOH, in terms of $Na_2O/SiO_2$, of between about 0.3 and 0.5 was found to be particularly effective, as indicated by conversions of from 82% to 93% zeolite A, based on adsorption analyses; at 0.1 $Na_2O/SiO_2$, product purities of above 72% were obtained, while pellets containing no preincorporated NaOH were found to have converted to 64% zeolite A and were weaker physically.

The method of the present invention may also be employed to advantage when the body to be converted to crystalline zeolite is shaped from powdered raw kaolin-type material, i.e., that which has not yet been made reactive by suitable treatment. For example, the comparative data of Table B below, relating in this case to zeolite A bodies, illustrate the advantage of incorporating NaOH with raw kaolin-type material before the shaping step. These bodies were slip-cast pellets which were air-dried for 16 hours, fired at 750° C. for 2 hours, digested at room temperature for 16 hours, and crystallized at 100° C. for 8 hours, using reaction mixtures of the following oxide-mole ratios, respectively:

$$Na_2O/SiO_2 = 0.8$$
$$SiO_2/Al_2O_3 = 2$$
$$H_2O/Na_2O = 20$$

and $$Na_2O/SiO_2 = 0.8$$
$$SiO_2/Al_2O_3 = 2$$
$$H_2O/Na_2O = 40$$

TABLE B

| Run | Incorporated NaOH as $Na_2O/SiO_2$ | Percent Conversion to Zeolite A |
|---|---|---|
| 1 | 0 | 60 |
| 2 | 0.25 | 79 |

Digestion and crystallization of the zeolite body may be accomplished by treating the reaction mixture in a single step or in two separate steps. When digestion and crystallization are conducted in separate steps, the first or digestion step takes place at a temperature from about room temperature (20–25° C.) up to about 55° C. Although the nature of the reactions taking place in this step are not clearly understood, it is believed that the system undergoes a type of diffusion or ripening process which prepares or otherwise conditions the reactants for conversion to the desired zeolite species in the second or crystallization step.

Since the digestion step apparently serves, among other things, to aid the diffusion or distribution of alkali metal ion and other reactants from the ambient reactant solution through the shaped body it is readily understandable that with a portion of the alkali metal hydroxide already included in the clay as herein disclosed, the first step may under some conditions be omitted, depending on the type of zeolite to be produced, the purity desired, reaction temperature and time, and other process factors.

The second or crystallization step of the process need not of necessity employ a reactant mixture of the same composition as that used in the first step. Thus, within the limits of reactant composition ratios specified for producing a particular zeolite species, one may add reactants, and/or possibly other substances as processing aids, during one or both steps, or between steps, as desired. In the second step the reaction temperature is usually maintained at between about 75 and 100° C., until crystals of the desired species form in situ, and may be maintained at temperatures up to about 175° C., although operation above about 100° C. requires pressure vessels and there is a tendency for the formation of unwanted aluminosilicates such as hydroxy-sodalite.

After the crystallization step, the zeolite bodies are separated from the spent reactant or mother liquors by removing the bodies from the crystallization vessel, or by withdrawing the liquors from the vessel or by other means. The spent liquors thus separated may be reused for the next batch of shaped reactive kaolin articles after adjustment with amounts of reactants to again give a properly proportioned reactant liquor. The zeolite bodies are then washed, either in the crystallization vessel or in a separate vessel, until the effluent wash water in equilibrium with the zeolite has a pH of between about 9 and 12. Thereafter the bodies are dried, conveniently with circulating air or in a vented oven at a temperature of between about 25° and 150° C. For purposes of characterization of the product by X-ray diffraction and chemical analysis this drying is sufficient. Characterization of the product by adsorption measurements requires that the zeolite first be activated or dehydrated as described hereinbelow.

Intensive agitation of the reactant mixture during digestion and crystallization is not necessary. Gentle circulation of the ambient liquor around the shaped bodies during reaction is sufficient and in fact, excellent results have been achieved under quiescent conditions.

In producing preforms of the silica-rich zeolites such as X and Y, digestion and crystallization periods somewhat longer than those used for producing zeolite A are employed. For example, digestion and crystallization times of 24 to 48 hours each at about 20° C. and about 100° C., respectively, may be used.

For producing preforms of zeolite A using preincorporated NaOH, the duration of the digestion step should be at least about 4 hours at a reaction temperature of 20-25° C., while about 1 hour will be sufficient at a temperature in the range of about 40-55° C. This first reaction step may extend to about 36-40 hours if desired, without detriment, although the longer reaction times lengthen the over-all processing time considerably and hence lack practicality from the point of view of economic operation on a relatively large scale.

In the second or crystallization step for producing zeolite A preforms, preferably conducted in the temperature range of about 75 to 100° C., the reaction time should be at least 1 hour. It should be noted that maintaining the zeolite A bodies in contact with the mother liquor for periods longer than about 48 hours may result in the crystalline zeolite A body changing or converting into other aluminosilicate species and/or amorphous substances.

In obtaining the data given herein, at least one X-ray diffraction spectrometer trace was secured of every zeolite product. From these traces the crystalline species present was identified. When proper controls were run (standard zeolites in the same hydration state run on the same day), estimates of percent composition could be made by comparing the intensities of certain X-ray lines in the preform sample with the intensities of the same lines in the standard. X-ray determinations on the products are usually lower than the determinations of purity based on adsorption measurements. Because of this difference, the reason for which is not entirely clear, the values of product purity reported herein by the X-ray method are minimum values. As used herein, the terms "product purity" in percent, and "product composition" in percent when based on the X-ray method of analysis described above, are defined as follows:

$$S_1/S_2 \times 100 = \text{percent product purity},$$

where $S_1$ = sum of intensities of suitable X-ray lines measured on the preform sample.

$S_2$ = sum of intensities of the same X-ray lines measured on the reference standard.

Adsorption measurements on samples of the preformed zeolites obtained by the process of this invention were carried out in a McBain-Bakr adsorption system. Before adsorption measurements are made, the crystalline zeolite body must be activated or dehydrated by heating, preferably at reduced pressure, for example at 350° C. and at a pressure of less than about 0.1 mm. Hg. The activated zeolite bodies made by the improved process of the invention have the molecular sieve properties characteristic of the particular species. The reference standards by which the relative purity of the shaped zeolite products was determined were very pure samples of the corresponding zeolite species prepared in powder form by the known synthesis method. As used herein, the terms "product purity" in percent and "product composition" in percent, when based on this adsorption method of analysis, are defined as follows:

$$W_1/W_2 \times 100 = \text{percent product purity},$$

where $W_1$ = weight loading of adsorbate measured on the activated preform $W_1$ = weight loading of the same adsorbate measured on the activated reference standard.

As stated hereinabove, a process wherein the shaped body or preform contains reactive kaolin substance, alkali metal hydroxide and crystalline zeolite before being converted to crystalline zeolite of the same species in situ is a preferred form of the invention. In brief, this process involves combining powdered reactive kaolin, alkali metal hydroxide and crystalline zeolite powder, along with any other ingredients as may be required for the zeolite to be produced, or as may be required to expedite processing, blending or other mixing means. From this mixture bodies of the desired shape and size as previously described are formed by extrusion, tumbling, slip-casting or other means. The resulting preforms or bodies are contacted with an aqueous mixture of alkali metal hydroxide and any other ingredients such as silica and alumina as may be required to achieve the desired over-all reactant composition in terms of $R_2O/SiO_2$, $SiO_2/Al_2O_3$ and $H_2O/R_2O$, where R is alkali metal, and thereafter the reactant mixture is thermally treated during digestion and crystallization steps to convert the preforms to a substantially pure crystalline zeolitic bodies. These bodies are washed, dried and activated or dehydrated to achieve the molecular sieve structure in bodies exhibiting relatively high volumetric adsorption capacity.

In making up the mixture to be shaped, the amount of zeolite incorporated therein may be from about 5 wt.-percent up to about 60 wt.-percent; however, we have found that at the higher contents of zeolite, above about 40 wt.-percent, the density of the zeolite body obtained after digestion, crystallization and activation tends to decrease, resulting in a smaller improvement in volumetric adsorption capacity, even though high purity is maintained, compared with that of activated bodies made by using zeolite powder and a binder. Hence, between about 10 and 30 wt.-percent zeolite is usually preferred for incorporation with the reactive kaolin and the alkali metal hydroxide before the shaping step, in order to realize satisfactory processing characteristics and a high-purity zeolite body exhibiting relatively high density and other desirable physical properties. An amount of water may be added to the reactive kaolin-alkali metal hydroxide mix consistent with the shaping procedure to be employed.

The amount of alkali metal hydroxide to be combined with the reactive kaolin-zeolite powder mixture to be shaped is, in the case of zeolite A preforms, desirably less than about 0.3 in terms of molar $Na_2O/SiO_2$ based on the $SiO_2$ content of the reactive kaolin, to minimize thermal or other effects which might be encountered during the step of incorporating caustic into the mix. At least about 0.10 $Na_2O/SiO_2$ is desirable in the mixture to be shaped in order to realize efficient processing and a high-purity zeolite A product. Following the shaping step, the bodies are dried in an oven, tray dryer, etc., usually to a moisture content of between about 5 and 30%, preferably less than 20 wt.-percent In the conversion, i.e., the digestion and crystallization steps, of the shaped body containing reactive kaolin, zeolite and caustic to a crystalline zeolite in situ, conducting this conversion in two steps is usually preferred for consistently high product purity, particularly where large batches must be handled during a process cycle. In the first or digestion step, reaction temperature in the range from about room temperature (20–25° C.) up to 55° C. may be employed. In the case of zeolite A bodies, a first-step reaction temperature of around 45° C. to 50° C. has been found quite satisfactory in expediting the completion of the over-all processing cycle, particularly where large batches are involved. Similarly, the second or crystallization step may be conducted at reaction temperatures between about 75 and 175° C., but preferably in the range of about 75 to 100° C., which temperatures are convenient to maintain, especially for large-scale processing. Crystallization temperatures somewhat below about 75° C. require unduly long periods of time, while conducting the crystallization at temperatures above about 100° C. has the disadvantage of requiring the use of pressurized crystallization vessels. Reaction times of between 1 and 36 hours for the first or digestion step over a temperature range of about 20°–55° C. may be employed, with, for example, between about 4 and 16 hours generally preferred for producing zeolite A bodies. In conducting the second or crystallization step at about 100° C. reaction times of from about 1 to 30 hours, preferably between 1 and 10 hours, may be employed to produce sodium zeolite A (also known as 4A) bodies. Crystallization times less than about one hour are insufficient for converting the body to high-purity zeolite, while if one allows the zeolite A body to remain in contact with the mother liquor longer than about 36 to 40 hours contaminating amounts of other aluminosilicates may form. Again, the digestion step may be conducted using a reactant composition differing somewhat from that subsequently used in the crystallization. Usually such a change in reactant composition between steps is made in the case of the water-to-alkali metal oxide ratio or the alkali metal oxide-to-silica ratio. In the case of 4A preformed bodies, for example, we have found that conversion is most satisfactorily achieved when the digestion system is more alkaline, i.e., a lower $H_2O/Na_2O$ ratio, than the crystallization system, as Table C below shows. Adjustment of reactant composition between the digestion and crystallization steps is conveniently accomplished by appropriate control of reactant solutions of known composition, for example, caustic liquors, which can be admitted or withdrawn from the reaction vessel through suitable valves and piping. Table C shows data on process conditions for sodium zeolite A exemplary of a preferred form of the process of the invention. In this table the term "capacity factor" is a value obtained as the product of the density of the zeolite body and the percent conversion or percent purity of that body. Use of this factor affords a means of comparing the volumetric adsorption capacity of adsorbent bodies. Furthermore, knowledge of such capacity values is useful in the selection and design of commercial adsorption equipment. By way of comparison, composites made by bonding 4A zeolite powder with a clay binder have a capacity factor of approximately 0.56. Thus, as will be noted from the values in Table C, high-purity 4A bodies made by the process of the invention have capacity factors as much as 25% higher than the present clay-bonded 4A molecular sieve articles. As will be apparent to those skilled in the adsorption art, an increase of such magnitude in the volumetric adsorption capacity for a solid adsorbent can result in a very worthwhile increase in the capacity of an adsorption system, or conversely, a permissible reduction in equipment size from that normally required.

TABLE C

*Production [a] of 4A Preforms From 4A Powder, Reactive Kaolin and Included Caustic*

| Composition [c] of Mixture Before Shaping [d] | | Digestion Conditions | | | | | Product Purity,[b] Percent 4A | Capacity Factor |
|---|---|---|---|---|---|---|---|---|
| Wt.— Percent 4A Powder | Wt.— Percent Reactive Kaolin | Time, Hr. | Temp., ° C. | Reactant Comp. | | | | |
| | | | | $Na_2O/SiO_2$ | $SiO_2/Al_2O_3$ | $H_2O/Na_2O$ | | |
| 10 | 90 | 0 | | | | | 78 | 0.64 |
| | | 4 | R.T. | 0.8 | 2.0 | 40 | 84 | 0.68 |
| | | 2 | 45 | 0.8 | 2.0 | 20 | 91 | 0.70 |
| | | 4 | 45 | 0.8 | 2.0 | 20 | 92 | 0.72 |
| 15 | 85 | 4 | R.T. | 0.8 | 2.0 | 20 | 92 | 0.71 |
| | | | | | | | 81 | 0.62 |
| 20 | 80 | 0 | | | | | 90 | 0.68 |
| | | 4 | R.T. | 0.8 | 2.0 | 20 | 94 | |
| | | 16 | R.T. | 0.8 | 2.0 | 20 | | |
| | | 4 | 45 | 0.8 | 2.0 | 20 | 92 | 0.72 |
| | | 16 | 45 | 0.8 | 2.0 | 20 | 95 | 0.74 |
| | | 24 | 45 | 0.8 | 2.0 | 20 | 92 | 0.72 |
| 25 | 75 | 0 | | | | | 82 | 0.66 |
| | | 4 | R.T. | 0.8 | 2.0 | 20 | 92 | 0.70 |
| 30 | 70 | 4 | 45 | 0.8 | 2.0 | 20 | 90 | 0.73 |

[a] Crystallization conducted for 4 hours at 100° C., using a reactant composition of $Na_2O/SiO_2=0.8$; $SiO_2/Al_2O_3=2.0$; $H_2O/Na_2O=40$ (exclusive of added zeolite A content).
[b] Based on adsorption of oxygen at −183° C. and 100 mm. Hg, and X-ray spectrometer analyses.
[c] Exclusive of water content of approximately 30 percent; included caustic equivalent to 0.15 $Na_2O/SiO_2$.
[d] 1/16 and 1/8-inch diameter pellets formed by extrusion.

In Table C, sodium zeolite A was produced in the form of 1/16 and 1/8-inch diameter pellets or cylindrical-shaped bodies by extrusion of mixtures containing 4A powder and reactive kaolin and included NaOH in an amount corresponding to 0.15 $Na_2O/SiO_2$.

Shaped zeolite A bodies obtained by the process of the invention, after activation or dehydration usually adsorb at least about 19 wt.-percent oxygen, measured at −183° C. and 100 mm. Hg pressure, and preferably at least about 21 wt.-percent oxygen, measured under the same conditions, to realize the highest volumetric adsorption capacities. By way of comparison, a typical value for the oxygen adsorption capacity of activated clay-bonded sodium zeolite A pellets is around 18.5 wt.-percent at −183° C. and 100 mm. Hg.

From the foregoing it is evident that just prior to the digestion-crystallization reactions the shaped body, containing at least reactive kaolin and incorporated alkali metal hydroxide, and also if desired, powdered crystalline zeolite and/or other reactants and/or additive materials, may be considered to be in a "green" or unconverted state. Thus, by the invention are obtained green shaped bodies or articles which in the case of zeolite A prior to conversion to zeolite A have compositions selected from within the following limits:

|  | Percent by wt. |
|---|---|
| (1) Reactive kaolin | 52–91 |
| Water | 5–30 |
| $Na_2O$ | 3.5–25 | or

|  | |
|---|---|
| (2) Reactive kaolin | 30–87 |
| Zeolite Type 4A powder | 2.5–47 |
| Water | 5–30 |
| $Na_2O$ | 1.5–25 |

It will be understood that the above compositions may also include minor amounts of additive materials such as extrusion aids, surface-active agents and the like. Although the green preformed bodies are often converted to crystalline zeolite in an adjacent processing zone as soon as the particular processing schedules permit, these bodies, particularly those having relatively simple shapes such as spheres or cylinders, have sufficient green strength that they may be stored for periods of time before conversion, or may, if desired, be transported over a substantial distance for conversion at another location.

Representative of the practice of the present invention are the following examples.

EXAMPLE I

One hundred ninety-four grams of flake caustic (NaOH) was mixed with 2 pounds of reactive kaolin and sufficient water to bring the moisture up to 30.5 wt.-percent. This mixture, a wet powder having 0.3 mole of included $Na_2O$ per mole of $SiO_2$, was placed in a rotating drum and tumbled until spherical beads of about 5 to 6 mesh size were formed. These beads were removed from the drum and dried to a moisture content of 25%. A 50-gram lot was digested for 16 hours at room temperature in a solution made up of 67 grams of water and 11.5 grams of NaOH, the over-all composition of the resulting aggregate mixture being 0.83 $Na_2O/SiO_2$—2.0 $SiO_2/Al_2O_3$—20 $H_2O/Na_2O$. The water-soda ratio of the mixture was then raised to 39 for the crystallization step by the addition of 74.5 grams of water and the reaction temperature increased to 100° C. and maintained thereat for 8 hours. The resulting crystalline beads of sodium zeolite A, after washing, drying and activation, adsorbed 22.6 wt.-percent oxygen at 700 mm. Hg and −183° C.

EXAMPLE II

One pound of 4A zeolite powder was mixed with 1200 grams of flake sodium hydroxide and then blended with 9 pounds of reactive kaolin. From this blended mix, containing 0.4 mole of included $Na_2O$ per mole of $SiO_2$, beads were formed by tumbling. A 100-gram lot of these beads containing 31 wt.-percent moisture was digested for 16 hours at room temperature in a solution made up of 128 grams of water and 15.5 grams of NaOH, the over-all composition of the resulting mixture being 0.86 $Na_2O/SiO_2$—2.0 $SiO_2/Al_2O_3$—24 $H_2O/Na_2O$. The water-soda ratio of the mixture was then raised to 45 for the crystallization step by the addition of 140 grams of water and the reaction temperature increased to 80° C., at which temperature crystallization was conducted for 8 hours. X-ray spectrometer analysis identified the beads as sodium zeolite A. An activated sample lot adsorbed 22.0 wt.-percent oxygen at 100 mm. Hg and −183° C.

EXAMPLE III

Three pounds of reactive kaolin and sufficient sodium hydroxide solution to achieve a molar $Na_2O/SiO_2$ ratio of 0.6 were placed in a muller for mixing. During this mulling operation it was apparent that the mix was too wet and additional reactive kaolin was added to bring the mix to an extrudable consistency. The resulting mix had a molar $Na_2O/SiO_2$ ratio of 0.42. From this mix ⅛₆-inch diameter pellets were extruded and air-dried overnight to a moisture content of 25 wt.-percent. A batch of these pellets was placed in an aqueous caustic liquor to supply the balance of the required $Na_2O$, the over-all composition of the resultant mixture of pellets and liquor being:

$Na_2O/SiO_2 = 1.2$
$SiO_2/Al_2O_3 = 2.0$
$H_2O/Na_2O = 40$

This reactant mixture was digested for 4 hours at 25° C. and crystallized at 100° C. for 6 hours. After washing, drying and activation, X-ray and adsorption analysis ($CO_2$ at 25° C. and 250 mm.) indicated that the pellets were 80% 4A with traces of hydroxysodalite.

EXAMPLE IV

One hundred and fifty pounds of reactive kaolin having a silica/alumina molar ratio of 2.0 and 133 lb. of Type 4A zeolite powder (52% moisture content) were dry-blended for 10 minutes in a muller, followed by addition of a mixture of 33 lb. of cold 50% caustic solution and 27 lb. of water, to achieve a $Na_2O/SiO_2$ inclusion ratio of 0.15, based on the $SiO_2$ content of the reactive kaolin. The batch (30 wt.-percent 4A and 70 wt.-percent reactive kaolin), which weighed 343 pounds on a wet basis, was mulled for 1 hour; after addition of 4 pounds of reactive kaolin to bring the mix up to the proper consistency, mulling was continued for ½ hours. At this point, the mix had a moisture content of 32%. The mix was transferred to the extruder. Two batches of pellets, one ⅛₆-inch diameter and the other ⅛-inch diameter, were extruded. The pellets were dried at 180° F. in a tray dryer to a moisture content of 12%.

The digestion and crystallization steps were conducted in a 300-gallon steam-jacketed kettle. A batch of ⅛₆-inch pellets weighing 41 pounds was contacted with a liquor comprised of 15.9 pounds of flake caustic (76% $Na_2O$) and 80 pounds of water, so that the over-all reactant mixture composition was 0.8 $Na_2O/SiO_2$—2.0 $SiO_2/Al_2O_3$—20 $H_2O/Na_2O$ for the digestion step conducted at 45° C. for 4 hours. For the crystallization step the $H_2O/Na_2O$ ratio was increased to 40 by the addition of 85 pounds of water and the reaction carried out at 100° C. for 4 hours. Liquor was circulated continually during the reaction steps while the temperature was maintained at the desired level by adjustment of the steam flow to the heating coil and jacket. The crystalline pellets were washed with boiling water. After drying and activation, the oxygen capacity of the pellets was 21.5 wt.-percent at −183° C. and 100 mm. Hg pressure, and the volumetric capacity factor was 0.73.

EXAMPLE V

A quantity of reactive kaolin weighing 963 grams was mulled with 277 grams of 76% flake caustic and water. After mulling for 35 minutes, 241 grams of 4A powder was added to the mix and mulling continued for another 10 minutes. The mulled mix was readily extruded through a die plate having ⅛-inch diameter openings. The extrusions were air-dried overnight, and divided into two batches. The first batch was digested in aqueous caustic liquor for 2 hours at room temperature and crystallized for 6 hours at 100° C.; the second batch was digested for 24 hours at room temperature and crystallized for 8 hours at 100° C. The over-all composition of the reactant mixture in both cases was:

$Na_2O/SiO_2 = 0.8$
$SiO_2/Al_2O_3 = 2.0$
$H_2O/Na_2O = 30$

After washing, drying and activation X-ray analysis identified the converted pellets as sodium zeolite A. Oxygen adsorption measurements at 700 mm. Hg and −183° C.

gave values of 22.4 and 23.1 wt.-percent respectively, indicative of high-purity zeolite A products.

In determining the quantities of reactants needed to provide the proper values for *a*, *b* and *c*, as hereinabove defined, for the case of aqueous reactant mixtures in which the preform also contains zeolite crystals added prior to forming, the composition of the additive zeolite is not included in such determination.

In the process of this invention, the preformed body may undergo a thermal treatment at least one of several temperature levels at a point in the process between the step of forming and the step of incorporating the body into the aqueous reactant mixture. Thus, the preform, if the kaolin content thereof is not already in a reactive condition, may be fired at a relatively high temperature as hereinabove described, or the preform containing reactive kaolin-type clay may, if desired, be heated to improve its physical properties, or as is usually the case, the preform is dried at room temperature or higher to provide a controlled moisture content before digestion. When zeolite powder is incorporated with the raw kaolin and alkali metal hydroxide before shaping, the firing temperature subsequently employed must be adjusted to the thermal stability limit of the particular zeolite.

The zeolite shapes made by the process of the invention may readily be ion-exchanged to replace all or part of the alkali metal cations in the crystalline body with cations of other species, such as calcium, and thus modify the selective adsorption properties of that body. Such cation exchange may be accomplished in one or more steps, using solutions containing cations of the desired species, by either batch or continuous ion-exchange methods.

Various changes or modifications may be made in the processes disclosed herein while securing to a greater or lesser extent some or all of the benefits of the invention, without departing from the spirit and scope thereof.

What is claimed is:

1. A method of producing a crystalline metal aluminosilicate zeolite in a preformed body, which method comprises providing an unreacted preformed body containing essentially a reactive kaolin-type clay and alkali metal hydroxide, said hydroxide being present in an amount equivalent to at least about 0.1 mole of alkali metal oxide per mole of the $SiO_2$ present in said body, and reacting said body in an aqueous reactant mixture until crystals of said zeolite are produced in said body, the aggregate of said preformed body and said aqueous reactant mixture having a $H_2O/Na_2O$ molar ratio of at least 20.

2. A method of producing crystalline zeolite A in a preformed body, which method comprises providing a mixture containing essentially a kaolin-type clay and sodium hydroxide in an amount sufficient to provide said mixture with a molar $Na_2O/SiO_2$ ratio of at least about 0.1, forming said mixture into a compact unreacted body, thermally treating said body at a temperature of at least 600° C., to render said kaolin-type clay reactive and reacting said body in an aqueous reactant mixture having in the aggregate a composition, including said body, expressed in terms of oxide mole ratios within the range of:

$$Na_2O/SiO_2 = 0.5\text{--}1.5$$
$$SiO_2/Al_2O_3 = 1.6\text{--}2.4$$
$$H_2O/Na_2O = 20\text{--}100$$

at a reaction temperature of at least about 20° C. until crystals of zeolite A are produced in said body.

3. A method of producing crystalline sodium zeolite A in a preformed body, which method comprises providing a mixture containing a kaolin-type clay in a reactive condition and sodium hydroxide in an amount sufficient to provide said mixture with a molar $Na_2O/SiO_2$ ratio in the range from about 0.1 to 0.7, forming said mixture into a compact unreacted body, drying said body, and reacting said body in an aqueous reactant mixture having in the aggregate a composition, including said body, expressed in terms of oxide mole ratios within the range of:

$$Na_2O/SiO_2 = 0.5\text{--}1.5$$
$$SiO_2/Al_2O_3 = 1.6\text{--}2.4$$
$$H_2O/Na_2O = 20\text{--}100$$

at a reaction temperature in the range from about 20° to 175° C. until crystals of sodium zeolite A are produced in said body.

4. A method of producing crystalline sodium zeolite A in a preformed body, which method comprises providing a mixture containing essentially a kaolin-type clay in a reactive condition and sodium hydroxide in an amount sufficient to provide said mixture with a molar $Na_2O/SiO_2$ ratio in the range from about 0.1 to 0.5, forming said mixture into a compact unreacted body, drying said body, and reacting said body to a moisture content between about 5 and 30 wt.-percent in an aqueous reactant mixture having in the aggregate a composition, including said body, expressed in terms of oxide mole ratios within the range of:

$$Na_2O/SiO_2 = 0.5\text{--}1.5$$
$$SiO_2/Al_2O_3 = 1.6\text{--}2.4$$
$$H_2O/Na_2O = 20\text{--}100$$

at a reaction temperature in the range from about 20° to 100° C. until crystals of sodium zeolite A are produced in said body.

5. A method of producing crystalline sodium zeolite A in a preformed body, which method comprises providing an unreacted preformed body containing between about 52 and 91 weight percent reactive kaolin, the remainder being sodium hydroxide and water, drying said body to a moisture content between about 5 and 30 wt.-percent, and reacting said body in an aqueous reactant mixture having in the aggregate a composition, including said body, expressed in terms of oxide mole ratios within the range of:

$$Na_2O/SiO_2 = 0.5\text{--}1.5$$
$$SiO_2/Al_2O_3 = 1.6\text{--}2.4$$
$$H_2O/Na_2O = 20\text{--}100$$

at a reaction temperature in the range from about 20° to 100° C. until crystals of sodium zeolite A are produced in said body.

6. A method of producing crystalline sodium zeolite A in a preformed body, which method comprises providing a mixture containing essentially a kaolin-type clay in a reactive condition and sodium hydroxide in an amount sufficient to provide said mixture with a molar $Na_2O/SiO_2$ ratio in the range from about 0.1 to 0.5, forming said mixture into a compact unreacted body, drying said body to a moisture content between about 5 and 30 wt.-percent, and reacting said body in an aqueous reactant mixture having in the aggregate a composition, including said body, expressed in terms of oxide mole ratios within the range of:

$$Na_2O/SiO_2 = 0.7\text{--}1.2$$
$$SiO_2/Al_2O_3 = \text{about } 2$$
$$H_2O/Na_2O = 20\text{--}50$$

at a reaction temperature in the range from about 20° to 100° C. until crystals of sodium zeolite A are produced in said body.

7. A method substantially as described in claim 1 for producing crystalline sodium zeolite X in a preformed body, wherein the alkali metal hydroxide is sodium hydroxide and the aqueous reactant mixture has a composition expressed in terms of oxide mole ratios of:

$$Na_2O/SiO_2 = \text{about } 1.5$$
$$SiO_2/Al_2O_3 = \text{about } 5$$
$$H_2O/Na_2O = 30\text{--}60$$

8. A method substantially as described in claim 1 for producing crystalline sodium zeolite Y in a preformed body, wherein the alkali metal hydroxide is sodium hydroxide and the aqueous reactant mixture has a composition expressed in terms of oxide mole ratios of:

$Na_2O/SiO_2$=about 0.5
$SiO_2/Al_2O_3$=about 7
$H_2O/Na_2O$=about 40

9. A method of producing a crystalline metal aluminosilicate zeolite in a preformed body, which method comprises providing an unreacted preformed body containing essentially a reactive kaolin-type clay, alkali metal hydroxide, said hydroxide being present in an amount equivalent to at least about 0.1 mole of alkali metal oxide per mole of the $SiO_2$ present in said body, and a crystalline zeolite, and reacting said body in an aqueous reactant mixture until additional crystals of said zeolite are produced in said body, the aggregate of said preformed body and said aqueous reactant mixture having a $H_2O/Na_2O$ molar ratio of at least 20.

10. A method of producing crystalline zeolite A in a preformed body, which method comprises providing a mixture containing essentially a kaolin-type clay, sodium hydroxide in an amount sufficient to provide said mixture with a molar $Na_2O/SiO_2$ ratio of at least about 0.1, and crystalline zeolite A, forming said mixture into a compact unreacted body, thermally treating said body at temperature of 600–850° C. to render said kaolin-type clay reactive, and reacting said body in an aqueous reactant mixture having in the aggregate a composition, including said clay and said sodium hydroxide but exclusive of said added zeolite A, expressed in terms of oxide mole ratios within the range of:

$Na_2O/SiO_2$=0.5–1.5
$SiO_2/Al_2O_3$=1.6–2.4
$H_2O/Na_2O$=20–100 at a reaction temperature in the range from about 20° to 100° C. until additional crystals of zeolite A are produced in said body.

11. A method of producing crystalline zeolite A in a preformed body, which method comprises providing a mixture containing essentially a kaolin-type clay in a reactive condition, sodium hydroxide in an amount sufficient to provide said mixture with a molar $Na_2O/SiO_2$ ratio of at least about 0.1, and crystalline zeolite A, forming said mixture into a compact unreacted body, drying said body to a moisture content between about 5 and 30 wt.-percent, and reacting said body in an aqueous reactant mixture having in the aggregate a composition, including said clay and said sodium hydroxide but exclusive of said added zeolite A, expressed in terms of oxide mole ratios within the range of:

$Na_2O/SiO_2$=0.5–1.5
$SiO_2/Al_2O_3$=1.6–2.4
$H_2O/Na_2O$=20–100 at a reaction temperature in the range from about 20° to 100° C. until additional crystals of zeolite A are produced in said body.

12. A method substantially as described in claim 11 wherein the mixture prior to forming contains essentially a kaolin-type clay in a reactive condition, sodium hydroxide in an amount sufficient to provide said mixture with a molar $Na_2O/SiO_2$ ratio in the range of about 0.1 to 0.5, and crystalline zeolite A in an amount in the range of about 5 to 60 weight percent of the dry mixture.

13. A method substantially as described in claim 11 wherein the crystalline zeolite A in the mixture prior to forming is present in an amount in the range of about 10 and 30 weight percent of the dry mixture.

14. A method substantially as described in claim 11 wherein the mixture prior to forming contains essentially a kaolin-type clay in a reactive condition, sodium hydroxide in an amount sufficient to provide said mixture with a molar $Na_2O/SiO_2$ ratio in the range of about 0.1 and 0.3, and crystalline zeolite A in an amount in the range of about 10 and 30 weight percent of the dry mixture.

15. A method substantially as described in claim 9 for producing crystalline sodium zeolite X in a preformed body, wherein the alkali metal hydroxide is sodium hydroxide, the added crystalline zeolite is zeolite X, and the aqueous reactant mixture has in the aggregate a composition, exclusive of said added zeolite X, expressed in terms of oxide mole ratios of:

$Na_2O/SiO_2$=about 1.5
$SiO_2/Al_2O_3$=about 5
$H_2O/Na_2O$=30–60

16. A method substantially as described in claim 9 for producing crystalline sodium zeolite Y in a preformed body, wherein the alkali metal hydroxide is sodium hydroxide, the added crystalline zeolite is zeolite Y, and the aqueous reactant mixture has in the aggregate a composition, exclusive of said added zeolite Y, expressed in terms of oxide mole ratios of:

$Na_2O/SiO_2$=about 5
$SiO_2/Al_2O_3$=about 7
$H_2O/Na_2O$=about 40

17. A method for producing crystalline zeolite A in an unreacted preformed body which method comprises providing a mixture containing essentially a kaolin-type clay in a reactive condition, sodium hydroxide in an amount sufficient to provide said mixture with a molar $Na_2O/SiO_2$ ratio of about 0.15, and crystalline zeolite A in an amount of from about 10 to 30 weight percent of the dry mixture, forming said mixture into a compact body, drying said body, contacting said body with an aqueous reactant mixture having in the aggregate a composition, including said reactive kaolin and said sodium hydroxide but exclusive of said added zeolite A, expressed in terms of oxide mole ratios, as follows:

$Na_2O/SiO_2$=about 0.8
$SiO_2/Al_2O_3$=about 2
$H_2O/Na_2O$=20 to 40 maintaining such reactant mixture at a digestion temperature of between about 20° and 55° C. for a period of between about 4 and 16 hours, thereafter maintaining such mixture at a crystallization temperature of about 100° C. for a period of between about 1 and 10 hours, to crystallize additional zeolite A in said body, recovering said body, and at least partly dehydrating said body.

References Cited in the file of this patent

UNITED STATES PATENTS

| | | |
|---|---|---|
| 1,477,757 | Hughes et al. | Dec. 18, 1923 |
| 1,499,795 | Wherry | July 1, 1924 |
| 2,143,670 | Young | Jan. 10, 1939 |
| 2,544,695 | Kumins | Mar. 13, 1951 |
| 2,882,243 | Milton | Apr. 14, 1959 |
| 2,904,607 | Mattox et al. | Sept. 15, 1959 |
| 2,992,068 | Haden et al. | July 11, 1961 |

FOREIGN PATENTS

| | | |
|---|---|---|
| 777,233 | Great Britain | June 19, 1957 |

UNITED STATES PATENT OFFICE
CERTIFICATE OF CORRECTION

Patent No. 3,119,659 January 28, 1964

Le Roy L. Taggart et al.

It is hereby certified that error appears in the above numbered patent requiring correction and that the said Letters Patent should read as corrected below.

Column 7, line 75, for "50" read -- 60 --; column 12, line 17, for "$W_1$" read -- $W_2$ --; column 18, lines 15 to 17, for "mixture into a compact unreacted body, drying said body, and reacting said body to a moisture content between about 5 and 30 wt.-percent in an aqueous reactant mixture" read -- mixture into a compact unreacted body, drying said body to a moisture content between about 5 and 30 wt.-percent, and reacting said body in an aqueous reactant mixture --.

Signed and sealed this 20th day of October 1964.

(SEAL)
Attest:

ERNEST W. SWIDER
Attesting Officer

EDWARD J. BRENNER
Commissioner of Patents